United States Patent
Chen et al.

(10) Patent No.: US 10,063,735 B2
(45) Date of Patent: Aug. 28, 2018

(54) IMAGE FILE MANAGEMENT METHOD, IMAGE CAPTURING DEVICE, IMAGE STORAGE DEVICE, AND COMPUTER READABLE MEDIUM THEREOF

(71) Applicant: VIVOTEK INC., New Taipei (TW)

(72) Inventors: Chea-Ping Chen, New Taipei (TW); Shih-Wu FanJiang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 239 days.

(21) Appl. No.: 14/960,438

(22) Filed: Dec. 6, 2015

(65) Prior Publication Data
US 2016/0191742 A1 Jun. 30, 2016

(30) Foreign Application Priority Data
Dec. 25, 2014 (TW) .............................. 103145537 A

(51) Int. Cl.
*H04N 1/21* (2006.01)

(52) U.S. Cl.
CPC ......... *H04N 1/2195* (2013.01); *H04N 1/2112* (2013.01); *H04N 2201/218* (2013.01)

(58) Field of Classification Search
CPC ............... H04N 1/2112; H04N 1/2195; H04N 5/23229; H04N 2201/218
See application file for complete search history.

(56) References Cited

U.S. PATENT DOCUMENTS

| | | | | |
|---|---|---|---|---|
| 7,339,613 | B2* | 3/2008 | Lee ................... | H04N 5/23222 348/208.99 |
| 2002/0033960 | A1* | 3/2002 | Kazami ............... | G11B 27/034 358/1.14 |
| 2003/0172094 | A1 | 9/2003 | Lauria | |
| 2008/0192129 | A1* | 8/2008 | Walker ................ | G11B 27/034 348/231.2 |
| 2009/0041114 | A1* | 2/2009 | Clark ................ | H04L 43/0829 375/240.01 |
| 2009/0122875 | A1 | 5/2009 | Den Hollander | |
| 2012/0057636 | A1 | 3/2012 | Tian | |
| 2015/0286897 | A1* | 10/2015 | Spaith ............... | G06F 17/3028 382/224 |
| 2016/0063009 | A1* | 3/2016 | Charania ........... | G06F 17/30085 707/693 |

FOREIGN PATENT DOCUMENTS

CN 103402067 A 11/2013

* cited by examiner

*Primary Examiner* — Daniel M Pasiewicz
(74) *Attorney, Agent, or Firm* — Winston Hsu

(57) ABSTRACT

An image file management method is applied to an image storage device. A plurality of image files is stored in the image storage device. The image file management method includes setting a first score of each image file according to a file size of each image file, setting a second score of each image file according to a storage time of each image file, and performing selective deletion of each image file according to the first score and the second score of each image file.

9 Claims, 4 Drawing Sheets

IMAGE FILE MANAGEMENT METHOD, IMAGE CAPTURING DEVICE, IMAGE STORAGE DEVICE, AND COMPUTER READABLE MEDIUM THEREOF

BACKGROUND OF THE INVENTION

1. Field of the Invention

The present invention relates to an image file management method, an image capturing device, an image storage device, and a computer readable medium thereof, and more specifically, to an image file management method for setting first and second scores of each image file according to a file size and a storage time of each image file and performing selective deletion of each image file according to the first and second scores of each image file, an image capturing device, an image storage device, and a computer readable medium thereof.

2. Description of the Prior Art

With development of the file storage technology, one single image capturing device or an image surveillance system with a plurality of image capturing devices usually has an image storage unit (e.g. a memory card or a hard disk drive) with a large storage space to store image files for image application (e.g. image surveillance). However, as the resolution of the image file increases, the file size of the image file rapidly increases such that the storage space of the image storage unit is usually not enough to store all image files captured by the image capturing device. Thus, the image capturing device (or the image surveillance system) could completely delete the image files stored at the earlier time from the storage space of the image storage unit, allowing that the newly-captured image files could be stored into the image storage unit. For example, before storing the image files captured at the second week into the image storage unit, the image capturing device could delete the image files captured at the first week in advance.

However, since the aforesaid file deletion method would delete the image files of high importance stored at the earlier time, this method may cause the problem that the image files of high importance have been deleted before being viewed by a user, so as to cause the user much inconvenience in reviewing the image files stored in the image storage unit.

SUMMARY OF THE INVENTION

The present invention provides an image file management method applied to an image storage device. A plurality of image files is stored in the image storage device. The image file management method includes setting a first score of each image file according to a file size of each image file, setting a second score of each image file according to a storage time of each image file, and performing selective deletion of each image file according to the first score and the second score of each image file.

The present invention further provides an image capturing device. The image capturing device includes an image capturing unit, an image storage unit, and a file management unit. The image capturing unit is used for capturing a plurality of image files. The image storage unit is connected to the image capturing unit for storing the plurality of image files. The file management unit is connected to the image storage unit for setting a first score of each image file according to a file size of each image file, setting a second score of each image file according to a storage time of each image file, and performing selective deletion of each image file according to the first score and the second score of each image file.

The present invention further provides an image storage device for connecting to at least one image capturing device. The image storage device includes an image storage unit and a file management unit. The image storage unit is used for storing a plurality of image files captured by the at least one image capturing device. The file management unit is connected to the image storage unit for setting a first score of each image file according to a file size of each image file, setting a second score of each image file according to a storage time of each image file, and performing selective deletion of each image file according to the first score and the second score of each image file.

The present invention further provides a computer readable medium for a computer having a storage module. The storage module stores a plurality of image files. After the computer readable medium is loaded into the computer, the computer readable medium enforces the aforesaid image file management method.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
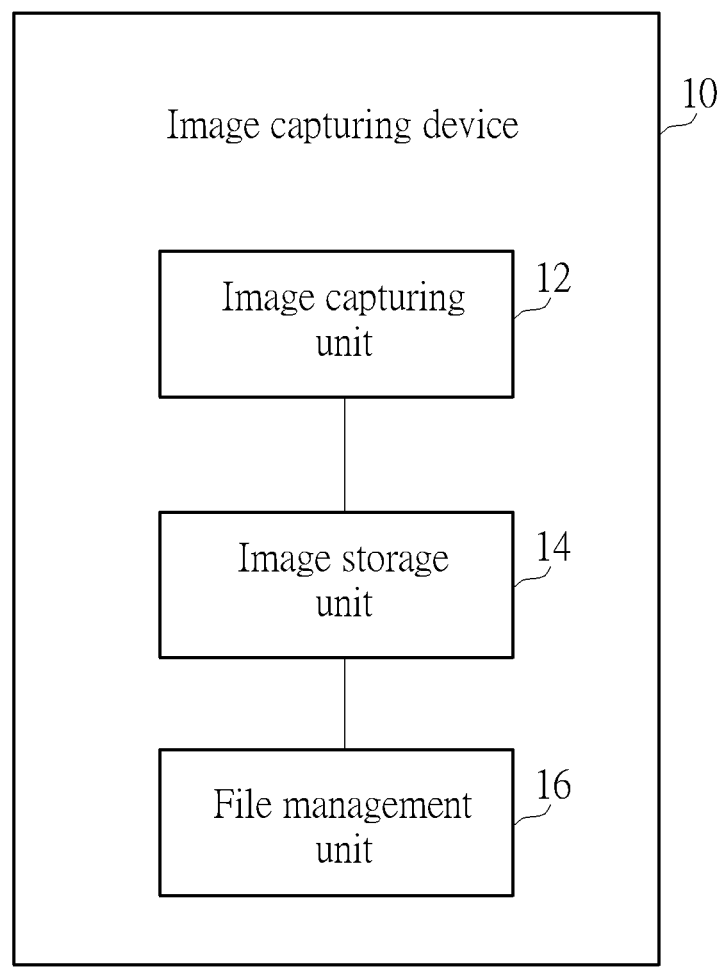
FIG. 1 is a functional block diagram of an image capturing device according to an embodiment of the present invention.

Please refer to FIG. 1, which is a functional block diagram of an image capturing device 10 according to an embodiment of the present invention. The image capturing device 10 could be preferably a conventional image surveillance apparatus (e.g. an IP camera) and includes an image capturing unit 12, an image storage unit 14, and a file management unit 16. The image capturing unit 12 could be an image capturing lens for capturing images. The image storage unit 14 could be a storage medium (e.g. a memory card or a hard disk drive) commonly applied to an image capturing device and is connected to the image capturing unit 12 for storing image files captured by the image capturing unit 12. The file management unit 16 is connected to the image storage unit 14 for setting a first score and a second score of each image file according to a file size and a storage time of each image file, and is used for performing selective deletion of each image file according to the first score and the second score of each image file so as to efficiently save the storage space of the image storage unit 14.

Figure 2:
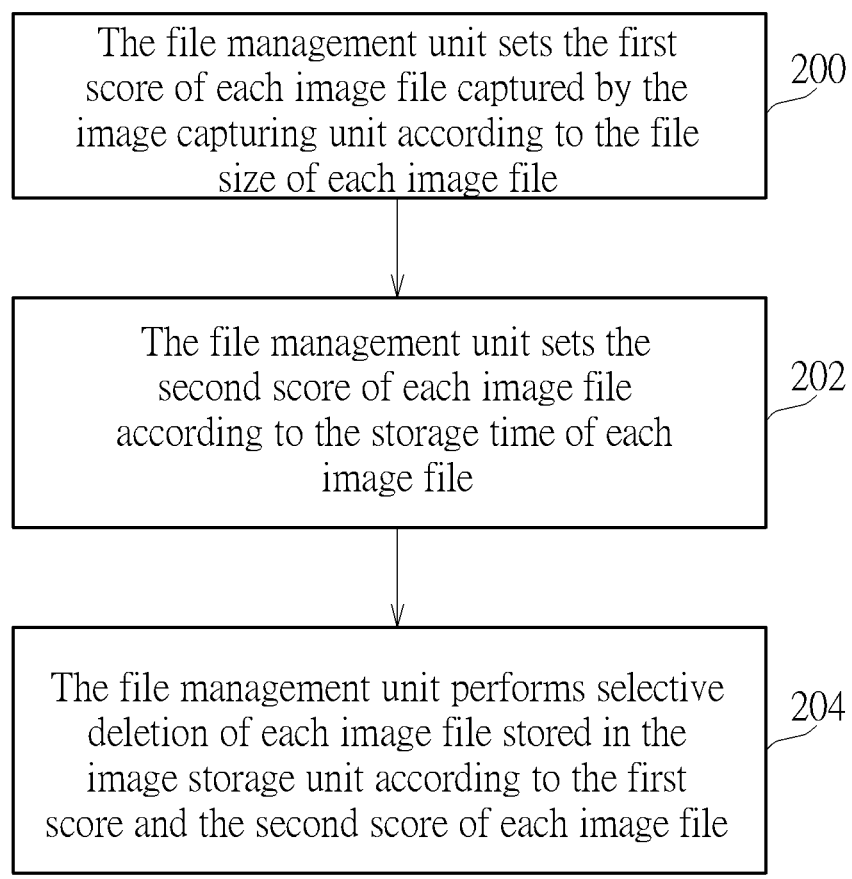
FIG. 2 is a flowchart of an image file management method according to an embodiment of the present invention.

Please refer to FIG. 1 and FIG. 2. FIG. 2 is a flowchart of an image file management method according to an embodiment of the present invention. As shown in FIG. 2, the image file management method of the present invention includes the following steps.

Step 200: The file management unit 16 sets the first score of each image file according to the file size of each image file.

Step 202: The file management unit 16 sets the second score of each image file according to the storage time of each image file captured by the image capturing unit 12.

Step 204: The file management unit 16 performs selective deletion of each image file stored in the image storage unit 14 according to the first score and the second score of each image file.

More detailed description for the following steps is provided as follows. After the image capturing unit 12 completes an image capturing operation and stores each captured image file into the image storage unit 14, the file management unit 16 could set the first score of each image file according to the file size of each image file (Step 200). For example, since the file management unit 16 could obtain frame sizes of an intra-frame (I-frame) and a plurality of predicted-frames (P-frame) in each GOP (Group of Pictures) of each image file according to header information of image packets in each image file transmitted from the image capturing unit 12, the file management unit 16 could score each image file accordingly. In practical application, since the frame sizes of the predicted frames in the GOPs having different resolutions are different from each other in the same image capturing condition, the file management unit 16 could perform a normalization process on the frame sizes of the intra-frame and the plurality of predicted-frames in each GOP of each image file in this embodiment. For example, the file management unit 16 could calculate a P-frame average size P of the predicted-frames of each GOP, and could calculate a ratio of an I-frame size I of the intra-frame to the P-frame average size P (i.e. I/P) or a ratio of the P-frame average size P to the I-frame size I (i.e. P/I), so that the file management unit 16 could score each image file according to the corresponding ratio. In such a manner, the purpose could be achieved that the image file having the smaller file size (i.e. the image file having the lower score) could be preferentially deleted.

Subsequently, after the file management unit 16 sets the first score of each image file according to the file size of each image file, the file management unit 16 could set the second score of each image file according to the storage time of each image file (Step 202). That is, the file management unit 16 could determine the image file stored at the earlier storage time as the image file having a higher deletion priority and reduce the second score of this image file accordingly.

Finally, in Step 204, the file management unit 16 could perform selective deletion of each image file stored in the image storage unit 14 according to the aforesaid first and second scores of each image file. To be more specific, in this embodiment, the file management unit 16 could calculate the first score and the second score of each image file to generate a corresponding composite score (e.g. by adding, multiplying, or averaging) and then record the composite score of each image file in a renewable table (e.g. Table 1 below). For example, the file management unit 16 could determine a week as a recording cycle and then record the first score, the second score, and the composite score of each image file stored in each time segment on each day in the week into Table 1. In Table 1, the first time segment corresponds to the morning of a day and the second time segment corresponds to the afternoon of the day (but not limited thereto, meaning that the file management unit 16 could also determine a capturing time of each image file (e.g. a half hour or one hour) as a time segment). In another embodiment, the file management unit 16 could add the first and second scores of each image file captured on each day to generate a total score of each day and then record the total score of each day in the week into Table 1.

Accordingly, the file management unit 16 could select the image files having relatively-lower composite scores from Table 1 (but not limited thereto, meaning that the file management unit 16 could also select the image files having the composite scores lower than a specific score), such as the image files captured by the image capturing unit 12 on Monday, Saturday, and Sunday, and could delete these selected image files. The amount of the image files deleted by the file management unit 16 could be predetermined by the image capturing device 10 or be defined by the user. To be noted, as shown in Table 1, since the second score is a time parameter, the second score of the image file having a relatively late storage time could be higher than the second score of the image file having a relatively early storage time, meaning that the image file at the first time segment on Monday could have a minimum score, the image file at the second time segment on Sunday could have a maximum score, and the second score of the image file in the first time segment could be less than the second score of the image file in the second time segment. Furthermore, since the image files are stored into the image storage unit 14 sequentially, the file management unit 16 could update the second score of each image file in real time when the following new image files are stored into the image storage unit 14, so as to ensure that the second score of the image file having a relatively late storage time must be higher than the second score of the image file having a relatively early storage time.

TABLE 1

|  |  | Date | | | | | | |
| --- | --- | --- | --- | --- | --- | --- | --- | --- |
|  |  | Mon. | Tue. | Wed. | Thu. | Fri. | Sat. | Sun. |
| First time segment | First score | 48 | 84 | 65 | 56 | 99 | 2 | 19 |
|  | Second score | 25 | 35 | 45 | 55 | 65 | 75 | 85 |
|  | Composite score | 73 | 119 | 110 | 111 | 164 | 77 | 104 |
| Second time segment | First score | 58 | 82 | 75 | 46 | 79 | 4 | 15 |
|  | Second score | 30 | 40 | 50 | 60 | 70 | 80 | 90 |
|  | Composite score | 88 | 122 | 125 | 106 | 149 | 84 | 105 |

In this embodiment, the whole image files determined to be deleted according to the first and second scores (i.e. the image files captured by the image capturing unit 12 on Monday, Saturday, and Sunday) could be completely deleted by the file management unit 16, but not limited thereto. For example, the file management unit 16 could only delete the plurality of predicted-frames in the GOPs of the image files determined to be deleted according to the first and second scores, or could utilize other frame deletion method to perform a frame deletion process on the GOPs of the image files determined to be deleted according to the first and second scores. As for which method is utilized, it depends on the practical application of the present invention.

It should be mentioned that the image file management method of the present invention could further include the step of setting a location weight of each image file. That is, the file management unit 16 could further set the location weight of each image file according to a geographical location where each image file is captured (i.e. a location where the image capturing device 10 monitors). That is, the file management unit 16 could determine the image file corresponding to an important surveillance location (e.g. an entrance of a lobby or a parking lot), which is predetermined by the image capturing device 10 or defined by the user, as the image file of high importance and increase the score of this image file accordingly. Accordingly, the file management unit 16 could calculate the first and second scores and the location weight of each image file (e.g. by adding the first score and the product of the second score and the location weight) to generate the corresponding composite score of each image file, and could perform selective deletion of each image file stored in the image storage unit 14 according to the composite score of each image file. In such a manner, the present invention could further improve accuracy of the image capturing device 10 in determining the importance of the image file and meet the practical surveillance needs.

Furthermore, if the image files captured by the image capturing unit 12 are organized into a plurality of image file groups respectively and each image file group corresponds to a time segment, the image file management method of the present invention could further include the step of setting a deletion ratio for one image file group when determining that a time segment of this image file group is earlier than a specific time and performing selective deletion of each image file according to the first and second scores of each image file and the deletion ratio of this image file group. For example, assuming that the image files captured by the image capturing unit 12 are organized into the image file groups corresponding to the first week and the second week and the second week is set as the aforesaid specific time, the file management unit 16 could set the deletion ratio (e.g. 50%) of the image file group corresponding to the first week (earlier than the second week), so as to ensure that the image file group at the relatively early time segment could have a higher deletion ratio, and then could perform selective deletion of each image file according to the first and second scores of each image file and the deletion ratio of the image file group corresponding to the first week. In such a manner, the file management unit 16 could delete more image files in the image file group at the relatively early time segment and keep more image files in the image file group at the relatively late time segment in a proportional deletion manner, so as to save the storage space of the image storage unit 14.

Moreover, in another embodiment, the file management unit 16 could perform proportional deletion of the image files in the image file groups corresponding to multiple weeks according to sequentially-decreasing ratios. For example, the file management unit 16 could set the deletion ratio of the image file groups corresponding to the first week in a month as 70%, set the deletion ratio of the image file groups corresponding to the second week in the month as 50%, set the deletion ratio of the image file groups corresponding to the third week in the month as 30%, and set the deletion ratio of the image file groups corresponding to the fourth week in the month as 10%.

Figure 3:
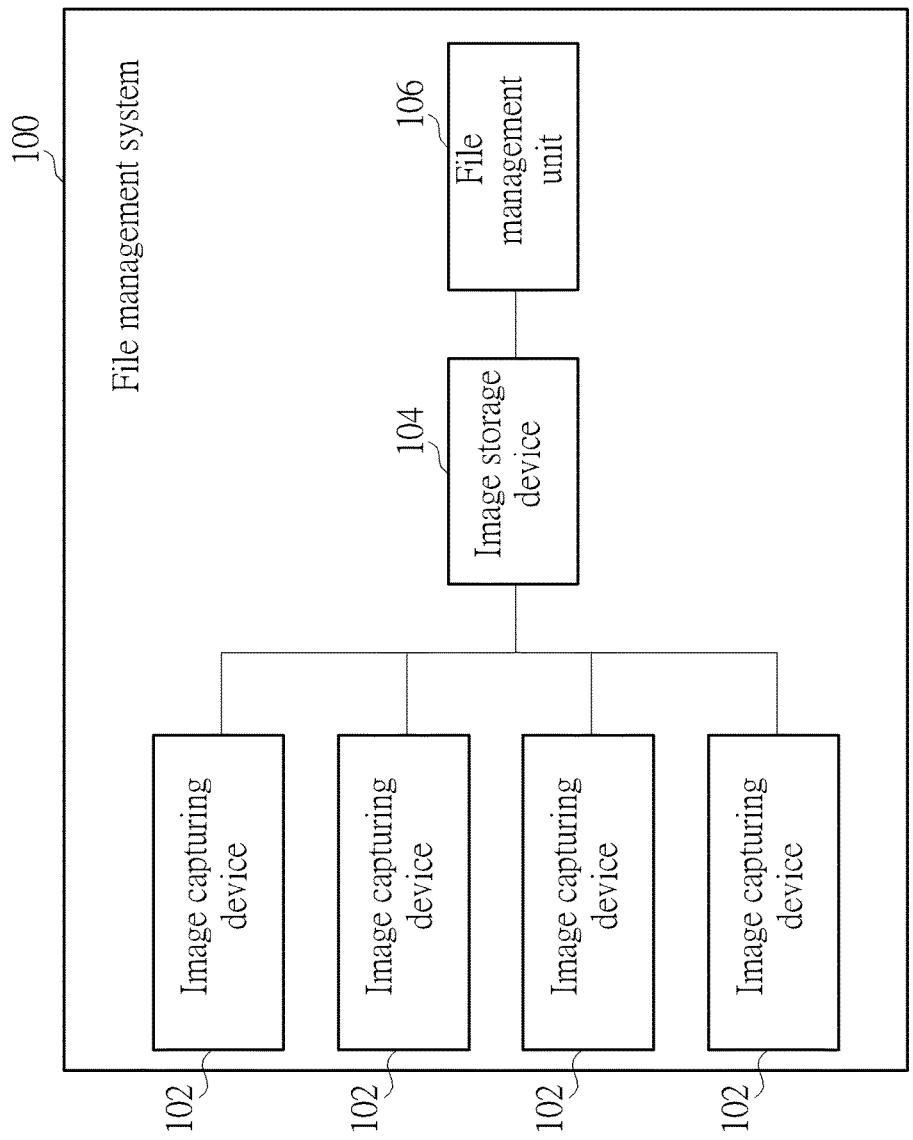
FIG. 3 is a functional block diagram of a file management system according to another embodiment of the present invention.

Furthermore, the image file management method of the present invention could be also applied to a file management system having a plurality of image capturing devices. For example, please refer to FIG. 3, which is a functional block diagram of a file management system 100 according to another embodiment of the present invention. The file management system 100 could be preferably an image surveillance system having a plurality of security cameras. The file management system 100 includes at least one image capturing device 102 (four shown in FIG. 3, but not limited thereto), an image storage device 104, and a file management unit 106. The image capturing device 102 could be a conventional security camera for capturing images. The image storage device 104 could be a storage medium (e.g. a hard disk drive or a network video recorder (NVR)) commonly applied to an image surveillance system, and could be connected to the image capturing device 102 for storing the image files captured by the image capturing device 102. The file management unit 106 is used for setting the first score and the second score of each image file according to the file size and the storage time of each image file, and is used for performing selective deletion of each image file according to the first score and the second score of each image file, so as to efficiently save the storage space of the image storage device 104. As for the related description for the image file management method of the file management unit 106, it could be reasoned by analogy according to the aforesaid embodiments and omitted herein.

Figure 4:
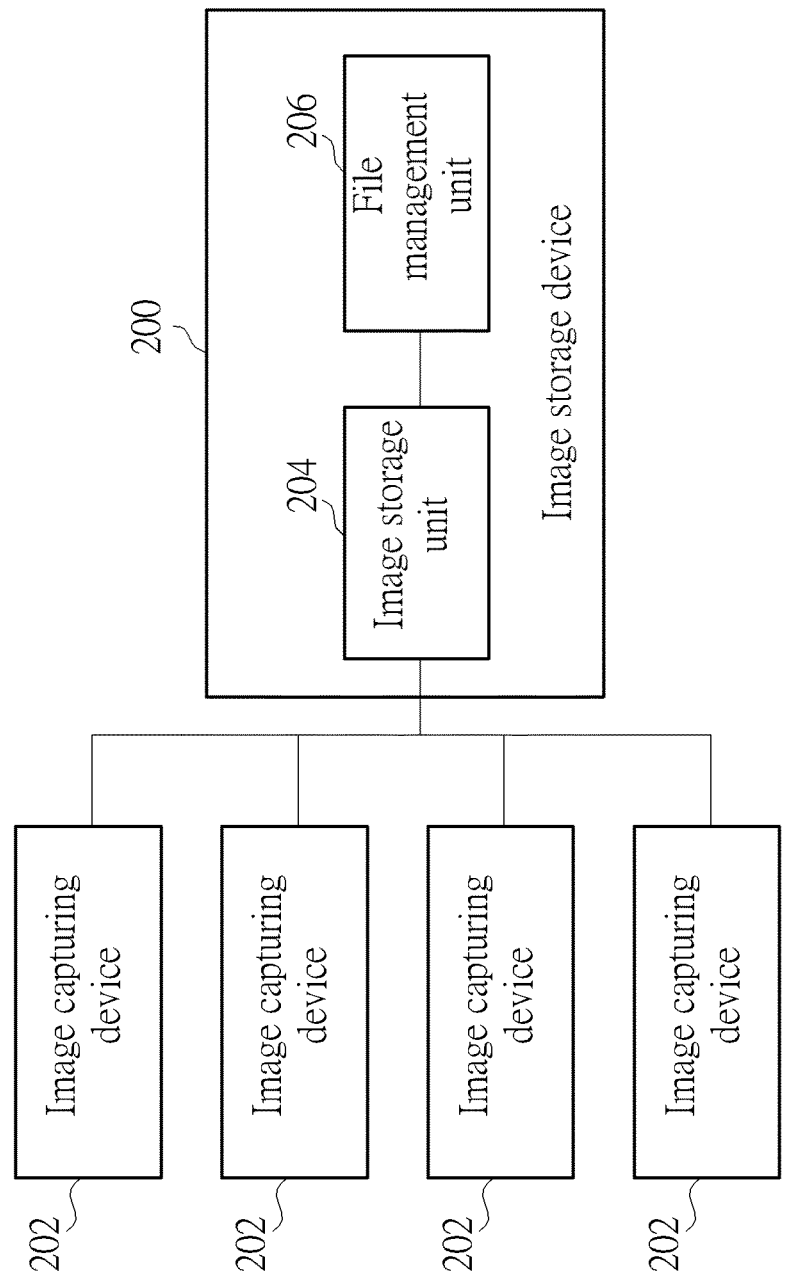
FIG. 4 is a functional block diagram of an image storage device according to another embodiment of the present invention.

Furthermore, the image file management method of the present invention could be also applied to an image storage device. For example, please refer to FIG. 4, which is a functional block diagram of an image storage device 200 according to another embodiment of the present invention. The image storage device 200 could be preferably an image storage apparatus (e.g. a network video recorder) connected to at least one image capturing device 202 (four shown in FIG. 4, but not limited thereto) for storing image files captured by the image capturing device 202. The image storage device 200 includes an image storage unit 204 and a file management unit 206. The image capturing device 202 could be a conventional security camera for capturing image files. The image storage unit 204 is used for storing the image files captured by the image capturing device 202. The file management unit 206 is used for setting the first score and the second score of each image file according to the file size and the storage time of each image file, and is used for performing selective deletion of each image file according to the first score and the second score of each image file, so as to efficiently save the storage space of the image storage unit 204. As for the related description for the image file management method of the file management unit 206, it could be reasoned by analogy according to the aforesaid embodiments and omitted herein.

Moreover, the image file management method of the present invention could be further applied to a computer readable medium. For example, the computer readable medium provided by the present invention could perform selective deletion of each image file according to the aforesaid image file management method after being loaded into a computer having a storage module. The related description for the computer readable medium could be reasoned by analogy according to the aforesaid embodiments and omitted herein.

Compared with the prior art in which the image files stored at the early storage time are directly deleted from the image storage unit, the present invention adopts the image file management method in which the first score and the second score of each image file are set according to the file size and the storage time of each image file and selective deletion of each image file is performed according to the first score and the second score of each image file. In such a manner, the present invention could solve the prior art problem that the image files of high importance have been deleted before being viewed by a user, so as to ensure that the image files of high importance could be still stored in the image storage unit even when deletion of the image files is performed for saving the storage space of the image storage unit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image file management method applied to an image storage device having a file management processor, a plurality of image files being stored in the image storage device, each image file having at least one GOP (Group of Pictures), the at least one GOP having an intra-frame (I-frame) and a plurality of predicted-frames (P-frames), the image file management method comprising:

the file management processor calculating a P-frame average size of the at least one GOP of each image file stored in the image storage device;

the file management processor calculating a ratio of an I-frame size and the P-frame average size of the at least one GOP of each image file stored in the image storage device;

the file management processor setting a first score of each image file stored in the image storage device according to the corresponding ratio;

the file management processor setting a second score of each image file stored in the image storage device according to a storage time of each image file stored in the image storage device; and the file management processor performing selective deletion of each image file stored in the image storage device according to the first score and the second score of each image file stored in the image storage device.

2. The image file management method of claim 1 further comprising:

setting a location weight of each image file according to a geographical location where each image file is captured;

wherein selective deletion of each image file is performed according to the first score, the second score, and the location weight of each image file.

3. The image file management method of claim 1, wherein the plurality of image files is organized into a plurality of image file groups respectively, each image file group corresponds to a time segment, and the image file management method further comprises:

when determining that a time segment of at least one image file group is earlier than a specific time, setting a deletion ratio for the at least one image file group;

wherein selective deletion of each image file is performed according to the first and second scores of each image file and the deletion ratio of the at least one image file group.

4. The image file management method of claim 1, wherein performing selective deletion of each image file according to the first score and the second score of each image file comprises:

completely deleting the image file determined to be deleted according to the first and second scores of the image file or only deleting the plurality of predicted-frames in the at least one GOP of the image file determined to be deleted according to the first and second scores of the image file.

5. An image storage device for connecting to at least one image capturing device, the image storage device comprising:

a non-transitory storage medium for storing a plurality of image files captured by the at least one image capturing device, each image file having at least one GOP (Group of Pictures), the at least one GOP having an intra-frame (I-frame) and a plurality of predicted-frames (P-frames); and a file management processor connected to the non-transitory storage medium for calculating a P-frame average size of the at least one GOP of each image file, calculating a ratio of an I-frame size and the P-frame average size of the at least one GOP of each image file, setting a first score of each image file according to the corresponding ratio, setting a second score of each image file according to a storage time of each image file, and performing selective deletion of each image file according to the first score and the second score of each image file.

6. The image storage device of claim 5, wherein the file management processor is further used for setting a location weight of each image file according to a geographical location where each image file is captured and performing selective deletion of each image file according to the first score, the second score, and the location weight of each image file.

7. The image storage device of claim 5, wherein the plurality of image files is organized into a plurality of image file groups respectively, each image file group corresponds to a time segment, the file management processor is used for setting a deletion ratio for at least one image file group when determining that a time segment of the at least one image file group is earlier than a specific time, and the file management processor is used for performing selective deletion of each image file according to the first and second scores of each image file and the deletion ratio of the at least one image file group.

8. The image storage device of claim 5, wherein the file management processor is used for completely deleting the image file determined to be deleted according to the first and second scores of the image file or only deleting the plurality of predicted-frames in the at least one GOP of the image file determined to be deleted according to the first and second scores of the image file.

9. A non-transitory computer readable medium for a computer having a storage module, the storage module storing a plurality of image files, the non-transitory computer readable medium enforcing the image file management method of claim 1 after the non-transitory computer readable medium is loaded into the computer.

* * * * *